United States Patent [19]

Mutsuda et al.

[11] Patent Number: 5,767,205
[45] Date of Patent: Jun. 16, 1998

US005767205A

[54] POLYACETAL RESIN COMPOSITION

[75] Inventors: Mitsuteru Mutsuda; Kenji Nakama, both of Hyogo, Japan

[73] Assignee: Daicel Chemical Industries, Ltd., Osaka, Japan

[21] Appl. No.: 535,510

[22] Filed: Sep. 28, 1995

[30] Foreign Application Priority Data

Oct. 26, 1994 [JP] Japan ................... 6-262545

[51] Int. Cl.$^6$ ................................................. C08L 59/00
[52] U.S. Cl. .................. 525/401; 525/399; 524/512; 524/542; 524/593; 524/251; 526/301
[58] Field of Search .................. 524/512, 542, 524/251, 593; 525/399, 401; 526/301

[56] References Cited

U.S. PATENT DOCUMENTS

| | | | |
|---|---|---|---|
| 4,179,479 | 12/1979 | Carter, Jr. | 525/66 |
| 4,480,071 | 10/1984 | Natarajan et al. | 524/593 |
| 4,639,488 | 1/1987 | Schuette et al. | 523/201 |
| 5,164,453 | 11/1992 | Fisher et al. | 525/69 |
| 5,250,606 | 10/1993 | Guest et al. | 525/399 |

FOREIGN PATENT DOCUMENTS

| | | |
|---|---|---|
| 0427874 | 5/1991 | European Pat. Off. |
| 0561582 | 9/1993 | European Pat. Off. |
| 69-000946 | 10/1969 | Japan . |
| 1038463 | 10/1989 | Japan . |

*Primary Examiner*—Andrew E.C. Merriam
*Attorney, Agent, or Firm*—Birch, Stewart, Kolasch & Birch, LLP

[57] ABSTRACT

A polyacetal resin is blended with a copolymer of styrene with 1-(1-isocyanato-1-methylethyl)-3-(1-methylethenyl) benzene to prepare a resin composition which does not cause phase separation, has an excellent extrusion stability, and provides excellent surface appearance and physical properties for a molding thereof.

12 Claims, 1 Drawing Sheet

POLYACETAL RESIN COMPOSITION

BACKGROUND OF THE INVENTION

1. Field of the Invention

The present invention relates to a polyacetal resin composition, and more particularly to a polyacetal resin composition which comprises a polyacetal resin and a bicopolymer of styrene with 1-(1-isocyanato-1-methylethyl)-3-(1-methylethenyl)benzene, and which can be formed into a molding having a good surface state.

2. Description of Related Arts

Since the marketing of polyacetal homopolymer and copolymer by E. I. du Pont de Nemours and Company, U.S.A., in 1960 and by Celanese Corporation, U.S.A., in 1962, respectively, various uses of them as representative engineering plastics have been developed thanks to their excellent performances. As the fields of application of polyacetal resins have been expanded, however, further improvements in the properties thereof as materials have increasingly been demanded. For example, a poor printability of polyacetal has been a problem in the case where it is necessary in an aspect of diversified user's needs to apply a variety of decoration or print on the surface of a molding thereof. Further, since polyacetal is such a highly crystalline resin as to involve a large mold shrinkage factor, the moldability thereof has been another problem.

Measures for solving these problems include a method wherein polyacetal is blended with an amorphous thermoplastic resin composition. One such example is blending of polyacetal with a polystyrene resin.

JP-B 44-946, published in 1969, relates to a fibrous material and a polymer mixture obtained according to this disclosure develops phase separation and delamination phenomena when used in molding thereof, thus being practically useless. It discloses a blend of polyacetal and polystyrene.

JP-A 1-38,463, published in 1989, discloses a composition comprising polyacetal and a specific high-viscosity polystyrene resin, which is effective in solving the foregoing problem, but the effect thereof is still insufficient. Furthermore, the resulting composition is increased in viscosity in particular to present a problem in an aspect of molding and fabrication. Thus, polyacetal resins are generally poor in compatibility with other resins, and hence involve the occurrence of phase separation even when mixed with another resin by melt kneading. Accordingly, a difficulty has been experienced in obtaining a mixture having an excellent extrusion stability without detriment to the surface appearance and mechanical properties of a molding thereof.

SUMMARY OF THE INVENTION

In view of the foregoing problems, the inventors of the present invention have aimed at obtaining a polyacetal resin composition comprising a polymer blend of a polyacetal resin with a polystyrene resin that is not only improved in dispersibility thereof to provide a molding having a uniform and smooth surface state and hence excellent friction and wear properties, but also improved in mold shrinkage factor, by obviating troubles such as development of a streaky phase separation structure on the surface of an injection molding because of the poor mutual dispersibility of the two resins and poor adhesion between the resin phases, and damage to friction and wear properties, as one feature of the polyacetal resin, due to the delamination caused by friction.

As a result of intensive investigations with a view to solving the foregoing problems, the inventors of the present invention have surprisingly found out that a polyacetal resin composition which has the foregoing defects obviated and can provide a good molding can be obtained by blending a polyacetal resin with a copolymer of styrene with 1-(1-isocyanato-1-methylethyl)-3-(1-methylethenyl)benzene. The present invention has been completed based on this finding.

The present invention provides a composition comprising or essentially consisting of polyacetal and a copolymer of styrene with 1-(1-isocyanato-1-methylethyl)-3-(1-methylethenyl)benzene, optionally including conventional additives. Then it provides a compatibilizer comprising or essentially consisting of a copolymer of styrene with 1-(1-isocyanato-1-methylethyl)-3-(1-methylethenyl)benzene.

Further, the present invention provides a polyacetal resin composition comprising 1 to 99 wt. % of (A) a polyacetal resin and 99 to 1 wt. % of (B) a copolymer of styrene with 1-(1-isocyanato-1-methylethyl)-3-(1-methylethenyl)benzene and being formable into a molding excellent in surface state, mechanical properties, printability, etc.

The invention provides a method (a method for compatibilizing polyacetal with a styrene resin by a copolymer of styrene with 1-(1-isocyanato-1-methylethyl)-3-(1-methylethenyl)benzene).

Any styrene resin may be used exept for the component (B).

The present invention will now be described in detail.

The polyacetal resin (A) to be used in the present invention is a polymeric compound having oxymethylene groups (—CH$_2$O—) as the main constituent units and may be any one of a polyoxymethylene homopolymer, and copolymers, terpolymers and block copolymers containing small amounts of other constituent units in addition to the oxymethylene groups. Further, the molecule of the polyacetal resin may have either a linear structure, or a branched or crosslinked structure. Furthermore, the degree of polymerization of the polyacetal resin is not particularly limited but may be of any value in so far as it can provide a moldability with the proviso that the number of terminal hydroxyl groups per molecule is at least 0.05, preferably at least 0.3. When this value is smaller than 0.05, the progress of the reaction between the isocyanate groups and the terminal hydroxyl groups tends to be so insufficient as to fail to secure a sufficient compatibilizing effect.

The compatibilizer (B) of the present invention comprises a copolymer of styrene with 1-(1-isocyanato-1-methylethyl)-3-(1-methylethenyl)benzene and is obtained by free-radical polymerization through the cleavage of the vinyl groups according by, for example, solution polymerization, suspension polymerization, emulsion polymerization, or bulk polymerization. The monomer composition for the polymerization is 80:20 to 99:1, preferably 85:15 to 99:1, and further preferably 90:10 to 98:2 in terms of the molar ratio of styrene monomer to 1-(1-isocyanato-1-methylethyl)-3-(1-methylethenyl)benzene. When the proportion of styrene monomer is beyond the above-mentioned range, any good compatibilized state of the resulting copolymer with the polyacetal resin can be expected. On the other hand, when it is below the above-mentioned range, the copolymer obtained according to a customary polymerization method is not sufficiently increased in molecular weight and so is poor in processability.

Alternatively, the compatibilizer (B) of the present invention may be an at least ternary copolymer prepared from styrene, 1-(1-isocyanato-1-methylethyl)-3-(1-methylethenyl)benzene and an additional vinylic monomer (s) copolymerizable therewith. Examples of such a vinylic monomer(s) include acrylonitrile and (meth)acrylic esters, among which acrylonitrile is especially preferable. When the vinylic monomer(s) is used in combination, the monomer composition as mentioned above is set to be in the above-mentioned range in terms of the ratio of the sum of the respective numbers of moles of styrene and the vinylic monomer(s) to the number of moles of 1-(1-isocyanato-1-methylethyl)-3-(1-methylethenyl)benzene.

Without particular restriction, any polymerization initiator usually used in free-radical polymerization can be used for the initiation of polymerization in a polymerization reaction for obtaining the compatibilizer (B) of the present invention. Examples of the polymerization initiator include azobisisobutyronitrile, dicumyl peroxide, t-butyl peroxybenzoate, t-butyl peroxyacetate, di-t-butyl peroxide, 2,5-dimethyl-2,5-di(t-butylperoxy)hexane, 1,1-bis(t-butylperoxy)-3,3,5-trimethylcyclohexane, and n-butyl-4,4-bis(t-butylperoxy)valerate.

The amounts of the components (A) and (B) to be blended with each other may be arbitrarily varied in the range of 99:1 to 1:99 in terms of (A) to (B) weight ratio. When they are outside the above-mentioned range, no features of forming the two components into a composite material can be secured.

The polyacetal resin composition of the present invention, which comprises the above-mentioned components (A) and (B), may further be blended with a catalyst for accelerating the reaction between the isocyanate groups of the component (B) and the terminal hydroxyl groups of the component (A). Such a catalyst may be used without particular restriction in so far as it can accelerate the reaction between the isocyanate groups and the hydroxyl groups and brings about no abnormal reactions at a temperature of about 200° C. Examples of the catalyst include 4-dimethylaminopyridine, dibutyltin laurate, and zinc stearate. The catalyst (C) may be added in an amount of 0.01 to 0.1 part by weight per 100 parts by weight of the polyacetal resin composition comprising the components (A) and (B).

The polyacetal resin composition of the present invention may be mixed with common additive(s) such as an antioxidizing agent, heat stabilizer, lubricant, nucleating agent, ultraviolet absorber, colorant, and/or release agent, and may further contain a small amount of a thermoplastic resin as a supplementary component.

The polyacetal resin composition of the present invention may further contain a fibrous filler such as a glass fiber or carbon fiber, or other filler for the purpose of imparting thereto mechanical strength, heat resistance, dimensional stability, electrical properties, etc.

The present invention further provides a resin composition comprising 99 to 1 wt. % of a polyacetal resin composition comprising the components (A) and (B) or the components (A), (B) and (C) and 1 to 99 wt. % of a polystyrene resin (D). The ratio of the former to the latter may be varied within the above-mentioned range in accordance with the purpose. The polystyrene resin that may be used in the present invention is one obtained through a free-radical or ionic polymerization of a styrene as the main monomer, as is well known. Any polystyrene resin obtained by bulk polymerization, solution polymerization, suspension polymerization, emulsion polymerization or the like can be industrially used. Further, besides a single polystyrene, the polystyrene resin (D) of the present invention may be one prepared by the copolymerization of a styrene as the main monomer with a reactive monomer such as other vinyl monomer, a diene compound or the like, or one containing a rubber component incorporated thereinto in so far as the properties thereof are not greatly spoiled. A single polystyrene resin or a copolymer resin of a styrene with acrylonitrile and/or butadiene and/or acrylic acid or its ester is especially preferably used as the polystyrene resin, specific preferred examples of which include polystyrene, poly-a-methylstyrene, and copolymers of a monomer thereof as the main monomer with an acrylic ester, a methacrylic ester, acrylonitrile, butadiene, chlorinated ethylene or the like.

The resin composition comprising the polyacetal resin composition of the present invention and the polystyrene resin as the component (D) is greatly improved in adhesion and compatibility therebetween. Assumably this is because the compatibilizer (B) of the present invention exercises a force through the reaction of the isocyanate groups of the compatibilizer (B) with the terminal hydroxyl groups of the polyacetal resin (A) and a force through the affinity of the main chain structure of the compatibilizer (B) for that of the polyacetal resin (A) to thereby improve the adhesion and compatibility between the polyacetal resin (A) and the polystyrene resin (D). Thus, it is necessary in the system comprising the components (A), (B) and (D) that the component (B) be compatible with the component (D). Examples of the method of realizing a good compatibility include one wherein a bicopolymer of styrene with 1-(1-isocyanato-1-methylethyl)-3-(1-methylethenyl)benzene is used as the component (B) when the component (D) is polystyrene, and one wherein a styrene/acrylonitrile/1-(1-isocyanato-1-methylethyl)-3-(1-methylethenyl)benzene tercopolymer is used as the component (B) when the component (D) is an acrylonitrile-styrene copolymer or ABS resin, whereby the main chain structure of the component (B) is made analogous to that of the component (D).

The polyacetal resin composition of the present invention can be prepared according to any one of various known methods. However, it is necessary that at least two components (A) and (B), three components (A), (B) and (C), or four components (A), (B), (C) and (D) be heat melted together and then kneaded for at least 30 seconds. These components may be used in combination with other component(s) and may be simultaneously or separately blended with the other component(s). Specifically, for example, the components (A), (B), (C) and (D) may be homogeneously premixed with one another in a mixer such as a tumbler or a Henschel mixer, fed into a single- or twin-screw extruder to be melt kneaded and pelletized, and then molded, or may be directly molded.

The treatment temperature is 5° to 100° C. higher than the melting temperature of the resin components, especially preferably 10° to 60° C. higher than the melting points of the resin components. When the temperature is too high, decomposition or abnormal reaction occurs unfavorably.

The melt-kneading time is at least 30 seconds and not beyond 15 minutes, preferably 1 to 10 minutes.

In general, a polyacetal resin is so poor in compatibility with other resins that it brings about phase separation even when mixed with other resin by melt kneading. Accordingly, a difficulty is encountered in obtaining a mixture having an excellent extrusion stability without detriment to the surface appearance and mechanical properties of a molding thereof. By contrast, according to the present invention, addition of a copolymer of styrene with 1-(1-isocyanato-1-methylethyl)-3-(1-methylethenyl)benzene, which has an isocyanate group, to a polyacetal resin composition enables fine and homogeneous dispersion thereof to thereby give a resin composition having good properties and comprising a polyacetal resin and other resin, particularly a polystyrene resin.

EXAMPLES

Figures 1A, 1B:
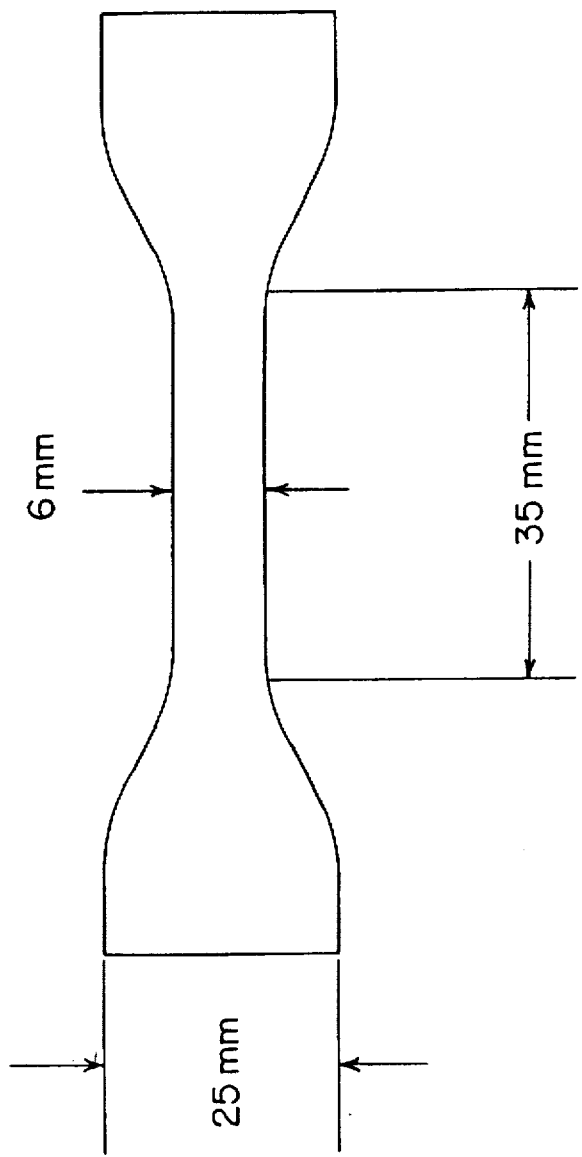
FIG. 1 is a schematic diagram of an evaluation sample formed from a resin composition obtained in Example.

The following Examples will more specifically illustrate the present invention, but should not be construed as limiting the scope of the present invention.

Examples 1 to 10 and Comparative Examples 1 to 4

Various resin compositions listed in Table 1 were prepared using the following starting materials.

(Starting Material 1)

polyacetal resin;

DURACON M 90-44 (hereinafter referred to briefly as "POM") manufactured by Polyplastics Co., Ltd. molecular weight: about 30,000 to 40,000;

number of hydroxyl groups per molecule: about 0.4.

(Starting Material 2)

polystyrene resin;

POLYSTYRENE R 80 (hereinafter referred to briefly as "HIPS") manufactured by Daicel Chemical Industries, Ltd.

$M_w$=235,000

(Starting Material 3)

ABS resin;

CEVIAN-V500 (hereinafter referred to briefly as "ABS"), ABS resin manufactured by Daicel Chemical Industries, Ltd.

(Starting Material 4)

styrene/1-(1-isocyanato-1-methylethyl)-3-(1-methylethenyl)benzene copolymer;

copolymer prepared by copolymerizing styrene with 1-(1-isocyanato-1-methylethyl)-3-(1-methylethenyl) benzene (hereinafter referred to as "TMI") (registered trademark) manufactured by Cyanamid Corporation in the presence of t-butyl peroxybenzoate as an initiator by solution polymerization (hereinafter referred to briefly as "PSTMI")

viscosity-average molecular weight (in terms of polystyrene)=about 100,000

(Starting Material 5)

styrene/acrylonitrile/1-(1-isocyanato-1-methylethyl)-3-(1-methylethenyl)benzene copolymer;

copolymer prepared by copolymerizing styrene with acrylonitrile and TMI (registered trademark) manufactured by Cyanamid Corporation in the presence of t-butyl peroxybenzoate as an initiator by solution polymerization (hereinafter referred to briefly as "ASTMI")

viscosity-average molecular weight (in terms of polystyrene)=about 150,000

(Starting Material 6)

4-dimethylaminopyridine (manufactured by Aldrich Chemical Company, Inc.) used as a catalyst (hereinafter referred to briefly as "DMAP")

A description will now be made of methods of respectively preparing (Starting Material 4) and (Starting Material 5), a method of melt kneading each composition, and a method of evaluation.

(1) Method of Preparing Starting Material 4

Styrene monomer, TMI, a solvent (toluene), and a polymerization initiator (t-butyl peroxybenzoate) were mixed together at a weight ratio of 47.48:2.50:49.98:0.040, and then heated to and kept at 120° C. with stirring to effect a reaction for 10 hours. The reaction mixture was cooled to room temperature and then slowly poured into a large amount of acetone with stirring. The formed precipitates were recovered and analyzed through quantitative determination of the isocyanate groups by NMR, IR, titration, etc., to find out that the resulting polymer was a polymeric compound having a composition represented by a styrene:TMI molar ratio of 98:2 and a viscosity-average molecular weight (in terms of polystyrene) of about 100,000.

(2) Method of Preparing Starting Material 5

Styrene monomer, acrylonitrile monomer, TMI, a solvent (toluene), and a polymerization initiator (t-butyl peroxybenzoate) were mixed together at a weight ratio of 31.65:15.83:2.50:49.98:0.050, and then heated to and kept at 80° C. with stirring to effect a reaction for 15 hours. The reaction mixture was cooled to room temperature and then slowly poured into a large amount of acetone with stirring. The formed precipitates were recovered and analyzed through quantitative determination of the isocyanate groups by NMR, IR, titration, etc., to find out that the resulting polymer was a polymeric compound having a composition represented by a styrene:acrylonitrile:TMI molar ratio of 71:27:2 and a viscosity-average molecular weight (in terms of polystyrene) of about 150,000.

(3) Method of Melt Kneading

In all cases, melt kneading was effected with a Brabender Henschel mixer manufactured by Haake Buchler Instruments Inc. at a kneading temperature of 200° C. for a kneading time of 5 minutes.

(4) Method of Forming Evaluation Sample

A resin composition obtained by melt kneading was melt pressed at 200° C. in a mold to form an evaluation sample having the shape as shown in FIG. 1.

The evaluation sample thus obtained was subjected to a tensile test at a cross head speed of 3 mm/min while using a TENSILON UCT-5T manufactured by Orientec Corporation to find out the breaking strength and breaking extension thereof and visually evaluate the state of delamination on the rupture cross-section thereof according to the following three ratings: x, Δ and ○.

x ... delamination occurred near the rupture cross-section and further delamination occurred by pickup between fingers.

Δ ... no delamination occurred near the rupture cross-section, which however appeared to be slightly separated into two phases, and no delamination occurred even by pickup between fingers.

○ ... no delamination was observed on the rupture cross-section.

The foregoing starting materials were blended together according to formulations as specified in Table 1 to prepare various resin compositions, which were then evaluated according to the foregoing method. The results are shown in Table 2.

TABLE 1

| | Starting material 1 | Starting material 2 | Starting material 3 | Starting material 4 or 5 (compatibilizer) | | Starting material 6 |
|---|---|---|---|---|---|---|
| | POM (wt %) | HIPS (wt %) | ABS (wt %) | Type | Amount added (pt. by wt.) | DMAP (pt. by wt.) |
| Ex. | | | | | | |
| 1 | 70 | 30 | — | PSTMI | 5* | 0.05* |
| 2 | 70 | 30 | — | PSTMI | 120 | 0.05 |
| 3 | 30 | 70 | — | PSTMI | 5 | 0.05 |
| 4 | 100 | 0 | — | PSTMI | 100 | 0.05 |
| 5 | 100 | 0 | — | PSTMI | 120 | 0.05 |
| 6 | 70 | — | 30 | ASTMI | 10 | — |
| 7 | 70 | — | 30 | ASTMI | 10 | 0.05 |
| 8 | 30 | — | 70 | ASTMI | 10 | 0.05 |
| 9 | 100 | — | 0 | ASTMI | 80 | 0.05 |
| 10 | 100 | — | 0 | ASTMI | 120 | 0.05 |
| Comp. Ex. | | | | | | |
| 1 | 70 | 30 | — | — | — | — |
| 2 | 100 | 0 | — | — | — | — |
| 3 | 70 | — | 30 | — | — | — |
| 4 | 30 | — | 70 | — | — | — |

Note
*The amounts of the starting material 4 or 5 and the starting material 6 added are based on 100 parts by weight of the total amount of the starting materials 1 to 3.

TABLE 2

| | Tensile breaking extension (%) | Tensile breaking strength (kg/cm$^2$) | Result of observation of delamination |
|---|---|---|---|
| Ex. 1 | 1.5 | 73.2 | o |
| Ex. 2 | 1.2 | 35.5 | o |
| Ex. 3 | 1.7 | 77.1 | o |
| Ex. 4 | 1.9 | 70.1 | o |
| Ex. 5 | 0.3 | 30.8 | o |
| Ex. 6 | 1.3 | 130.0 | o |
| Ex. 7 | 1.4 | 142.6 | o |
| Ex. 8 | 1.6 | 145.5 | o |
| Ex. 9 | 1.3 | 140.2 | o |
| Ex. 10 | 0.6 | 34.4 | o |
| Comp. Ex. 1 | 0.4 | 50.2 | x |
| Comp. Ex. 2 | 0.5 | 55.4 | x |
| Comp. Ex. 3 | 0.3 | 80.3 | x |
| Comp. Ex. 4 | 0.4 | 82.9 | x |

What we claim is:

1. A polyacetal resin composition comprising:

100 parts by weight of a blend comprising 30 to 100 wt. % of (A) a polyacetal resin; and 70 to zero percent by weight of (D) a polystyrene resin; and 5 to 100 parts by wt. of (B) a copolymer of styrene with 1- (1-isocyanato-1-methylethyl)-3-(1-methylethenyl)-benzene.

2. The composition as claimed in claim 1, wherein said copolymer (B) is an at least ternary copolymer of styrene with 1-(1-isocyanato-1-methylethyl)-3-(1-methylethenyl) benzene and a compound having a vinyl group copolymerizable therewith.

3. The composition as claimed in claim 1, which further comprises, per 100 parts by weight of the composition, 0.01 to 0.1 part by weight of (C) a catalyst for accelerating a reaction between isocyanate groups and hydroxyl groups.

4. A polyacetal composition comprising 99 to 1 wt. % of the composition as claimed in claim 1 and 1 to 99 wt. % of (D) a polystyrene resin.

5. The composition as claimed in claim 4, wherein said polystyrene resin (D) is a polystyrene or a copolymer resin of styrene with acrylonitrile and/or butadiene and/or acrylic acid or its ester.

6. A method for compatibilizing polyacetal with a styrene resin by blending a copolymer of styrene with 1-(1-isocyanato-1-methylethyl)-3-(1-methylethenyl)benzene.

7. The composition as claimed in claim 2, wherein said compound having a vinyl group copolymerizable therewith is selected from the group consisting of acrylonitrile and (meth)acrylic esters.

8. The composition as claimed in claim 1, wherein said polyacetal resin (A), prior to being combined with said copolymer, exhibits a number of terminal hydroxyl groups per molecule of at least 0.3.

9. The composition as claimed in claim 1, wherein said copolymer (B) comprises said styrene and said 1-(1-isocyanato-1-methylethyl)-3-(1-methylethenyl)-benzene in a molar ratio of 80:20 to 99:1, respectively.

10. The composition as claimed in claim 9, wherein said copolymer (B) comprises said styrene and said 1-(1-isocyanato-1-methylethyl)-3-(1-methylethenyl)-benzene in a molar ratio of 90:10 to 98:2, respectively.

11. A method for compatibilizing polyacetal with styrene, which comprises:

copolymerizing styrene and 1-(1-isocyanato-1-methylethyl)-3-(1-methylethenyl)-benzene; and melt kneading said copolymer with polyacetal resin.

12. A polyacetal resin composition comprising:

100 parts by weight of a blend comprising 30 to 100 wt. % of (A) a polyacetal resin; and 70 to zero percent by weight of (D) a polystyrene resin; and 5 to 100 parts by wt. of (B) a copolymer of styrene with 1- (1-isocyanato-1-methylethyl)-3-(1-methylethenyl)-benzene, wherein isocyanate groups of said component (B) and the terminal hydroxyl group of said component (A) are reacted and form a grafted copolymer.

* * * * *